United States Patent
Wagner et al.

(10) Patent No.: US 11,222,204 B2
(45) Date of Patent: Jan. 11, 2022

(54) CREATION OF A 3D CITY MODEL FROM OBLIQUE IMAGING AND LIDAR DATA

(71) Applicants: LEICA GEOSYSTEMS AG, Heerbrugg (CH); AIRBORNE HYDROGRAPHY AB, Jönköping (SE)

(72) Inventors: Rüdiger Wagner, Oberriet (CH); Anders Ekelund, Jönköping (SE); Andreas Axelsson, Bankeryd (SE); Patrick Steinmann, Heerbrugg (CH)

(73) Assignees: LEICA GEOSYSTEMS AG, Heerbrugg (CH); AIRBORNE HYDROGRAPHY AB, Jönköping (SE)

( * ) Notice: Subject to any disclaimer, the term of this patent is extended or adjusted under 35 U.S.C. 154(b) by 223 days.

(21) Appl. No.: 15/468,057

(22) Filed: Mar. 23, 2017

(65) Prior Publication Data
US 2017/0277951 A1    Sep. 28, 2017

(30) Foreign Application Priority Data
Mar. 23, 2016    (EP) .................................... 16162106

(51) Int. Cl.
*G06K 9/00* (2006.01)
*H04N 13/282* (2018.01)
(Continued)

(52) U.S. Cl.
CPC ........ *G06K 9/00637* (2013.01); *G01C 11/025* (2013.01); *G01S 7/4808* (2013.01);
(Continued)

(58) Field of Classification Search
CPC combination set(s) only.
See application file for complete search history.

(56) References Cited

U.S. PATENT DOCUMENTS

| 8,805,088 B1* | 8/2014 | Mesolongitis | ......... | G06K 17/00 |
| | | | | 382/216 |
| 2002/0060784 A1* | 5/2002 | Pack | ....................... | G01S 17/42 |
| | | | | 356/6 |

(Continued)

FOREIGN PATENT DOCUMENTS

| CN | 104049245 A | 9/2014 |
| CN | 104376595 A | 2/2015 |

OTHER PUBLICATIONS

Cramer, "The DGPF-Test on Digital Airborne Camera Evaluation—Over-view and Test Design", PFG Feb. 2010, Jan. 12, 2010, pp. 1-10.
(Continued)

*Primary Examiner* — Md N Haque
(74) *Attorney, Agent, or Firm* — Maschoff Brennan

(57) ABSTRACT

A method and a hybrid 3D-imaging device for surveying of a city scape for creation of a 3D city model. According to the invention, lidar data is acquired simultaneously with the acquisition of imaging data for stereoscopic imaging, i.e. acquisition of imaging and lidar data in one go during the same measuring process. The lidar data is combined with the imaging data for generating a 3D point cloud for extraction of a 3D city model, wherein the lidar data is used for compensating and addressing particular problem areas of generic stereoscopic image processing, in particular areas with unfavourable lighting conditions and areas where the accuracy and efficiency of stereoscopic point matching and point extraction is strongly reduced.

18 Claims, 3 Drawing Sheets

Figure 1A:
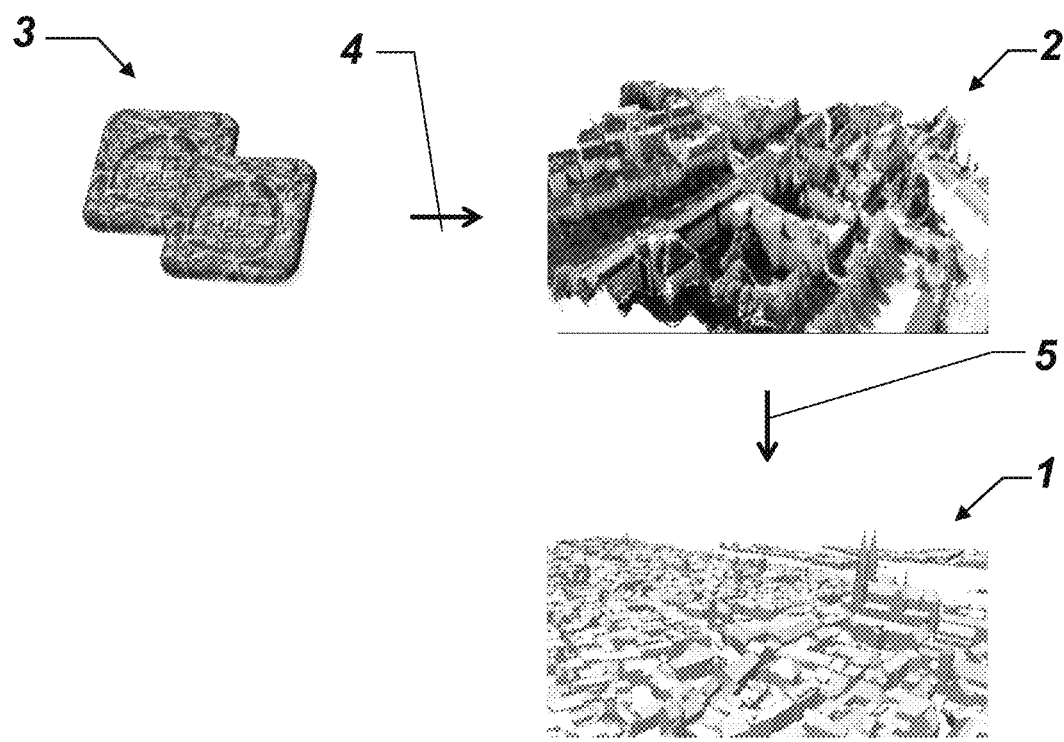

(51) Int. Cl.
- *G01S 17/89* (2020.01)
- *G03B 37/04* (2021.01)
- *G03B 15/00* (2021.01)
- *G01S 7/48* (2006.01)
- *G01S 17/86* (2020.01)
- *G01C 11/02* (2006.01)
- *G06K 9/62* (2006.01)
- *G06T 7/00* (2017.01)
- *G06T 17/05* (2011.01)

(52) U.S. Cl.
CPC .............. *G01S 17/86* (2020.01); *G01S 17/89* (2013.01); *G03B 15/006* (2013.01); *G03B 37/04* (2013.01); *G06K 9/00201* (2013.01); *G06K 9/6202* (2013.01); *G06K 9/628* (2013.01); *G06T 7/0002* (2013.01); *G06T 17/05* (2013.01); *H04N 13/282* (2018.05); *G06T 2207/10028* (2013.01); *G06T 2207/30168* (2013.01); *G06T 2207/30184* (2013.01)

(56) References Cited

U.S. PATENT DOCUMENTS

| | | | | |
|---|---|---|---|---|
| 2009/0189888 | A1* | 7/2009 | Dollner | G06T 17/05 345/419 |
| 2012/0007982 | A1* | 1/2012 | Giuffrida | H04N 7/181 348/144 |
| 2012/0218296 | A1* | 8/2012 | Belimpasakis | G06Q 30/0261 345/633 |
| 2013/0198146 | A1* | 8/2013 | Trotta | G06F 16/2365 707/687 |
| 2015/0097834 | A1* | 4/2015 | Ma | G06T 17/05 345/426 |
| 2016/0061954 | A1 | 3/2016 | Walsh et al. | |
| 2017/0200309 | A1* | 7/2017 | Qian | G06T 15/04 |
| 2017/0293216 | A1* | 10/2017 | Liu | G03B 15/006 |

OTHER PUBLICATIONS

Demir & Baltsavias, "Automated Modeling of 3d Building Roofs Using Image and LIDAR Data", ISPRS Annals of Photogrammetry, Remote Sensing and Spatial Information Sciences, vol. I-4, Aug. 25, 2012, pp. 35-40.

Vu et al., "Multi-scale solution for building extraction from LiDAR and image data", International Journal of Applied Earth Observation and Geoinformation, vol. 11, Issue 4, Aug. 2009, pp. 281-289.
European Search Report dated Jan. 10, 2017 as received in Application No. 16162106.5.

* cited by examiner

CREATION OF A 3D CITY MODEL FROM OBLIQUE IMAGING AND LIDAR DATA

FIELD OF THE INVENTION

The present invention relates to a method for surveying of a city scape and for creation of a 3D city model of the surveyed city scape, a hybrid 3D-imaging device for surveying of a city scape for creation of a 3D city model, and a computer program product.

BACKGROUND 3D city models, i.e. digital models of urban areas representing different terrain surfaces and infrastructure, are used in a large number of different application domains. Within a single framework 3D city models allow for displaying, managing, and analysing complex urban city scenarios. Typically, the 3D city models are generated at various levels of detail (LOD) and abstraction, and at multiple resolutions. For example, "CityGML" is a common information model for the representation of 3D urban objects which defines five LODs for building models:

LOD 0: 2.5D footprints,
LOD 1: buildings represented by block models,
LOD 2: building models with standard roof structures,
LOD 3: detailed (architectural) building models, and
LOD 4: LOD 3 supplemented with interior features.

The models typically comprise of GIS data, in particular for creating digital terrain models (DTM), high-level CAD data for buildings and infrastructure elements, and BIM data for providing the highest level of detail for building components. Applications for 3D city models are multifarious, e.g. navigation systems, urban planning and architecture, archaeology, geodesign, emergency management, gaming or augmented reality applications, intelligent transportation systems, property management, and so forth.

Automatic creation of 3D city models (GIS ready buildings) and 3D meshes assists in providing up-to-date geospatial base layers for Smart City applications, wherein textured and GIS-ready 3D models are usually generated from stereo images and/or perspective views. In a first step, based on image based point matching, point clouds are generated using single global matching algorithms (SGM) or similar techniques. Specialized software is used, to extract 3D models out of these point clouds, e.g. based on additional input such as building footprints or data from multispectral cameras. For example, the Leica RCD30 with multispectral capability allows the generation of normalized difference vegetation index images (NDVI images) to eliminate vegetation and thus to improve the recognition rate of objects within the point cloud, e.g. by geometric or semantic classification.

3D representation of landscapes and urban areas may also be achieved by creating meshes from point clouds, the point clouds being generated through the extraction from stereo images using SGM or similar techniques. In certain cases objects might also be extracted from lidar data, however in the case of city modelling objects such as buildings or infrastructure are often not textured and of low resolution. Thus, for city modelling it is common practice however, that such meshes are more likely generated from nadir and/or oblique imaging as image data offers better resolution and thus more detail.

Point clouds generated from imaging, even for very dense overlaps (dense matching), typically show problem areas where efficient point extraction is not good enough. For example, this is the case for occlusions and canyons with low lighting conditions, for shadow areas exhibiting increased noise, for very inhomogeneous areas such as vegetation, and for very homogeneous surfaces such as water. In the case of automatic 3D building model creation this might cause wrong building identification, wrong ground height identification, and reduced accuracy. In the case of 3D mesh generation problems such as meltdown on building edges, wrong ground height, and modelling of trees inside the mesh may occur.

Point clouds from lidar data generally do not have such issues. However, due to the lower point density, meshes have far less detail and are often not textured.

It is therefore an aspect of the present invention to improve creation of 3D city models and 3D meshes.

It is an aspect to generally improve the efficiency and accuracy of object extraction, particularly building extraction, from stereo images for creating a 3D city model, wherein it is a particular aspect to improve point cloud extraction from stereo images.

Another aspect of the invention is to reduce point mismatching in a stereo imaging method for creating a 3D city model, in particular caused by homogeneous surfaces, vegetation, occlusions, or low lighting conditions, e.g. caused by shadow areas.

It is a particular aspect of the invention to improve ground referencing, particularly to improve infrastructure height referencing and street modelling.

Those aspects are achieved by realising the features of the independent claims. Features which further develop the invention in an alternative or advantageous manner are described in the dependent patent claims.

The invention relates to a method for surveying of a city scape and for creation of a 3D city model of the surveyed city scape, in particular from aerial mapping data, the method comprising acquisition of imaging data of an area of the city scape, the imaging data being adapted for generation of 3D information, and simultaneous acquisition of lidar data for the area of the city scape, generation of a 3D point cloud of the area of the city scape, based on the imaging and lidar data, and generation of a 3D city model with automated building model extraction, based on the 3D point cloud.

Here, simultaneous acquisition of the imaging and lidar data means an acquisition of the imaging and lidar data during the same measuring process, in particular from one combined device, i.e. in one go when surveying a city scape but not necessarily exactly time synchronous.

The method is characterized in that the generation of the 3D point cloud of the area of the city scape is based on processing of the imaging data regarding generation of 3D information, a quality assessment of the imaging data based on data classification, wherein at least part of the imaging data being assigned to a first class being defined by at least one of a defined first classification criterion for the imaging data, and a defined second classification criterion within a first auxiliary 3D point cloud solely based on the imaging data, in particular wherein the auxiliary 3D point cloud being generated solely by the imaging data fulfilling the first classification criterion, a combination of the imaging data of the first class with lidar data corresponding to the fraction of the area of the city scape defined by the imaging data of the first class, in the following called the critical area, in particular wherein the imaging data being replaced or supplemented by the lidar data.

In particular, at least one of the first and second classification criteria might be based on at least one of geometric and semantic classification, e.g. such as a classification into at least one of regions with shadowing, e.g. with low signal to noise (S/N), regions with occlusions, regions with specific surface texture, e.g. such as very homogeneous regions such as water, and regions with vegetation. Furthermore, classification might be based on statistical properties, e.g. such as noise background, particularly by means of a S/N threshold, and/or thresholds based on an error propagation model for point matching in a stereoscopic image processing method.

The combination of the imaging data and the lidar data might be based on at least one of a 3D mesh of two or more point clouds, the point clouds particularly being generated by a point matching algorithm such as single global matching (SGM), replacement of imaging data with lidar data, replacement of lidar data with imaging data, and a reference model generated based on the lidar data, in particular the reference model comprising at least one of a digital terrain model, a digital elevation model, and a digital surface model.

The generation of the 3D city model might be based on generic classification algorithms for extracting a 3D city model from a point cloud, particularly a point cloud generated by stereoscopic imaging, and the extraction and generation of the 3D city model might be further based on at least one of GIS data, in particular for creating digital terrain models (DTM), high-level CAD data for buildings and infrastructure elements, BIM data, and multispectral information, e.g. such as normalized difference vegetation index images (NDVI images).

Therefore, by combining the best of the two worlds of stereoscopic imaging and lidar, i.e. high resolution information by stereoscopic imaging and lighting independent information by lidar, the generation of a 3D city model is strongly improved, in particular regarding efficiency and accuracy of object extraction. Problems regarding wrong building extraction and wrong ground height identification of automatic 3D building model creation are strongly mitigated and in particular for 3D mesh generation a meltdown on building edges, wrong ground height, or modelling of trees inside the mesh are strongly prevented.

In a particular embodiment of the method according to the invention, the generation of the 3D point cloud is further based on a quality assessment of the lidar data, wherein at least part of the lidar data being assigned to a second class being defined by at least one of
 a defined third classification criterion within a second auxiliary 3D point cloud solely based on the lidar data, in particular solely based on the lidar data of the critical area, and
 a defined first comparison criterion for comparing the first auxiliary 3D point cloud solely based on the imaging data with a third auxiliary point cloud based on a combination of the imaging and the lidar data, in particular wherein the imaging and lidar data being solely data of the critical area,
wherein the imaging data of the first class is only combined with lidar data of the critical area where the critical area is overlapping the fraction of the area of the city scape defined by the lidar data of the second class.

Therefore, before combining the imaging data and the lidar data for the critical area, the quality of the lidar data might be assessed by inherent properties of the lidar data, e.g. such as a local resolution threshold, a local S/N threshold, and/or a semantic classification into objects particularly well suited for lidar observations, e.g. such as flat surfaces. On the other hand, there might be regions or objects which are not well suited for lidar observations, e.g. very low reflection surfaces, and thus a combination of the imaging data with lidar data would introduce additional noise or systematic errors. Furthermore, the first comparison criterion might provide a quality control in a sense that a combination of the imaging data with the lidar data actually leads to an improved 3D point cloud generation compared to a 3D point cloud solely based on the imaging data. For example such a comparison criterion might be based on a differential S/N threshold, a resolution threshold, and/or a differential threshold based on systematic error propagation.

Typically point clouds generated from lidar data have much lower point density and meshes have far less detail and are often not textured. Therefore, in most cases for 3D city modelling the point cloud generation is mainly based on stereoscopic imaging with much higher resolution, and, according to the present invention, the lidar data is only consulted for critical areas, e.g. where lighting conditions for classical imaging are not favourable. However, depending on the desired level of detail (LOD) of the 3D city model and/or the type of the imaging device, there might be applications where the desired LOD might only be achieved by a combination of imaging data with lidar data. On the other hand, for example for a quick look analysis of very low level of detail it might be preferred to replace as much of the imaging data by lidar data, e.g. because processing of lidar data might require less computing power, in particular since lidar data is inherently representing a point cloud.

Thus a main driver for combining the imaging data with the lidar data might also be based on the overall quality of the lidar data acquired for the area of the surveyed city scape, i.e. not only for critical areas of the imaging data. Therefore, in another embodiment of the invention the generation of the 3D point cloud is further based on a quality assessment of the lidar data based on data classification, wherein at least part of the lidar data being assigned to a third class being defined by at least one of
 a defined fourth classification criterion within the second auxiliary 3D point cloud solely based on the lidar data, and
 a defined second comparison criterion for comparing the first auxiliary 3D point cloud solely based on the imaging data with the third auxiliary point cloud based on a combination of the imaging and the lidar data,
wherein the imaging data corresponding to the fraction of the area of the city scape defined by the lidar data of the third class being combined with the lidar data of the third class.

Again the quality of the lidar data might be assessed by inherent properties of the lidar data, e.g. such as a local resolution threshold, a local S/N threshold, and/or a semantic classification into objects particularly well suited for lidar observations, e.g. such as flat surfaces. On the other hand, there might be regions or objects which are not well suited for lidar observations, e.g. very low reflection surfaces, and thus a combination of the imaging data with lidar data would introduce additional noise or systematic errors. Similar to the case of the first comparison criterion above the second comparison criterion might provide a quality control in a sense that a combination of the imaging data with the lidar data actually leads to an improved 3D point cloud generation compared to a 3D point cloud solely based on the imaging data. For example such a comparison criterion might be based on a differential S/N threshold, a resolution threshold, and/or a differential threshold based on systematic error propagation.

A particular embodiment of the method is characterized in that at least one of the first to fourth classification criteria being based on a semantic classification, in particular wherein the semantic classification comprises semantic classifiers defining at least one of shadowing, a region with an occlusion, a region with vegetation, and a region with a homogeneous surface, in particular a water surface. For these regions even lower resolution lidar data may provide substantial support for point matching algorithms, e.g. by providing a digital surface model and lighting independent information. Semantic classification might comprise any generic semantic classification algorithms, e.g. based on identification of geometric 3D primitives, single point recognition and edge tracking algorithms, object extraction based on probabilistic algorithms, infrastructure models, and statistical models for different surface texture.

In a further embodiment at least one of the first to second comparison criteria is based on at least one of a signal to noise threshold, a resolution threshold, and a systematic error threshold, in particular based on an error propagation model for point mismatching. The thresholds may be based on the desired level of detail of the 3D city scape or they may be specifically tuned for efficient processing.

Since the lidar data is typically used as supporting data, e.g. for critical areas when generating a 3D point cloud based on stereoscopic imaging, the acquisition of the lidar data might be specifically tuned to be only taken for these critical areas of the city scape, e.g. to reduce requirements on data storage and processing power. Thus in another embodiment the lidar data is acquired for a selected region of the area within the surveyed city scape, based on at least one of an a-priori model of the surveyed city scape, and an analysis of the imaging data, particularly the quality assessment of the imaging data, in particular the critical area. For many applications of city modelling a first estimate or a first 3D model of the city might be available before surveying. Thus, the scan pattern for acquiring the lidar data might be specifically tuned to cover only the critical areas, but e.g. with high resolution, in particular using a Palmer scanning lidar device or a lidar device with a fast sweeping mirror. Furthermore, the selection might also be based on a real-time analysis and information of the imaging data, e.g. by a 2D classification of the imaging data or the quality assessment of the imaging data for generating the 3D point cloud.

Another embodiment of the method according to the invention is described wherein the generation of the 3D point cloud for the 3D city model is based on a photogrammetric method, in particular a semi global matching algorithm, wherein the photogrammetric method being adapted for processing at least one of nadir and/or oblique images, particularly with oblique angles between 30-45 degrees, multispectral images, in particular RGB and/or RGBN images, normalized difference vegetation index images (NDVI images), building footprints, and a reference model comprising at least one of a digital terrain model, a digital elevation model, and a digital surface model.

Here, multispectral image information and NDVI images might be used for semantic discrimination of objects with specific wavelength and polarization dependent reflection properties, such as for example typical reflection signals for vegetation and water. Building footprints and the reference model might particularly provide a ground reference and thus improve infrastructure modelling. In particular the building footprints and the reference model might be automatically generated based on the lidar data.

A further embodiment is described in that the imaging data and the lidar data are acquired by one single hybrid 3D-imaging device, in particular the hybrid 3D-imaging device comprising a nadir imaging camera, in particular exactly one nadir imaging camera, particularly with multispectral bands, an oblique imaging camera, in particular a RGB or RGBN camera, in particular exactly four oblique imaging cameras with oblique angles of 30-45 degrees, and a lidar device, in particular exactly one lidar device.

Thus, this setup provides an efficient and simultaneous acquisition of both imaging and lidar data, in a sense that the imaging and lidar data are acquired during the same surveying measurement, i.e. in one go, and wherein the imaging data can be readily processed within a stereoscopic method, e.g. by semi global matching, for creating the 3D point cloud for the generation of the 3D city model. In particular, such a hybrid 3D-imaging device might be installed in one standard aircraft hole, e.g. using a single stabilization system for stabilizing a common inertial system for the cameras and the lidar device, and being controlled by a single operator from a single controlling interface. Operation might be further supported by a dedicated mission planning software taking into account the surveyable city scape and making recommendations for operating both lidar and imaging devices to optimize data acquisition.

The invention further relates to a hybrid 3D-imaging device for surveying of a city scape, in particular an aerial hybrid 3D-imaging device, for creation of a 3D city model of the surveyed city scape, the hybrid 3D-imaging device comprising an imaging device for generating imaging data for an area of the city scape, the imaging data being adapted for generation of 3D information, in particular wherein the area being imaged from at least two different image viewing angles, a lidar device for generating lidar data for the area of the city scape, simultaneously to the generation of the imaging data, and a control and processing unit being adapted for
controlling the imaging device and the lidar device,
generating a 3D point cloud for the area of the city scape based on the imaging and the lidar data, and
generating a 3D city model with automated building model extraction, based on the 3D point cloud.

Here, simultaneous acquisition of the imaging and lidar data means an acquisition of the imaging and lidar data during the same measuring process, i.e. in one go when surveying a city scape but not necessarily exactly time synchronous.

The system is characterized in that the control and processing unit being adapted for generating the 3D point cloud with processing of the imaging data regarding generation of 3D information, assessing a quality of the imaging data based on data classification, wherein at least part of the imaging data being assigned to a first class being defined by at least one of
a defined first classification criterion for the imaging data, and
a defined second classification criterion within a first auxiliary 3D point cloud solely based on the imaging data, in particular wherein the auxiliary 3D point cloud being generated solely by the imaging data fulfilling the first classification criterion, combining the imaging data of the first class with lidar data corresponding to the fraction of the area of the city scape defined by the imaging data of the first class, in the following called the critical area, in particular wherein the imaging data being replaced or supplemented by the lidar data.

In a particular embodiment of the hybrid 3D-imaging device according to the invention, the control and processing unit is adapted for generating the 3D point cloud with a quality assessment of the lidar data, wherein at least part of the lidar data being assigned to a second class being defined by at least one of
- a defined third classification criterion within a second auxiliary 3D point cloud solely based on the lidar data, in particular solely based on the lidar data of the critical area, and
- a defined first comparison criterion for comparing the first auxiliary 3D point cloud solely based on the imaging data with a third auxiliary point cloud based on a combination of the imaging and the lidar data, in particular wherein the imaging and lidar data being solely data of the critical area, wherein the imaging data of the first class is only combined with lidar data of the critical area where the critical area is overlapping the fraction of the area of the city scape defined by the lidar data of the second class.

In another embodiment of the hybrid 3D-imaging device the control and processing unit is adapted for generating the 3D point cloud with a quality assessment of the lidar data based on data classification, wherein at least part of the lidar data being assigned to a third class being defined by at least one of
- a defined fourth classification criterion within the second auxiliary 3D point cloud solely based on the lidar data, and
- a defined second comparison criterion for comparing the first auxiliary 3D point cloud solely based on the imaging data with the third auxiliary point cloud based on a combination of the imaging and the lidar data, wherein the imaging data corresponding to the fraction of the area of the city scape defined by the lidar data of the third class being combined with the lidar data of the third class.

A particular embodiment of the hybrid 3D-imaging device is characterized in that at least one of the first to fourth classification criteria being based on a semantic classification, in particular wherein the semantic classification comprises semantic classifiers defining at least one of shadowing, a region with an occlusion, a region with vegetation, and a region with a homogeneous surface, in particular a water surface.

In a further embodiment of the hybrid 3D-imaging device at least one of the first to second comparison criteria is based on at least one of a signal to noise threshold, a resolution threshold, and a systematic error threshold, in particular based on an error propagation model for point mismatching.

In another embodiment the hybrid 3D-imaging device is adapted for acquiring lidar data for a selected region of the area within the surveyed city scape, based on at least one of an a-priori model of the surveyed city scape, and an analysis of the imaging data, particularly the quality assessment of the imaging data, in particular the critical area.

In a particular embodiment of the hybrid 3D-imaging device the control and processing unit is adapted for generating the 3D point cloud for the 3D city model with a photogrammetric method, in particular a semi global matching algorithm, and wherein the control and processing unit is adapted for processing at least one of nadir and/or oblique images, particularly with oblique angles between 30-45 degrees, multispectral images, in particular RGB and/or RGBN images, normalized difference vegetation index images (NDVI images), building footprints, and a reference model comprising at least one of a digital terrain model, a digital elevation model, and a digital surface model.

In a further embodiment the hybrid 3D-imaging device is built as one single hybrid 3D-imaging device, in particular the hybrid imaging device comprising a nadir imaging camera, in particular exactly one nadir imaging camera, particularly with multispectral bands, an oblique imaging camera, in particular a RGB or RGBN camera, in particular exactly four oblique imaging cameras with oblique angles of 30-45 degrees, and a lidar device, in particular exactly one lidar device or two lidar devices.

The invention also relates to a computer program product for generating a 3D city model of a surveyed city scape according to the inventive method, the computer program product being stored on a control and processing unit, particularly being part of a hybrid 3D-imaging device according to the invention, and comprising program code being configured for
- automatically communicating with a database comprising imaging and lidar data of a surveyed city scape,
- generating a 3D point cloud of the area of the city scape based on the imaging and lidar data, wherein the generation of the 3D point cloud being further based on
  - a quality assessment of the imaging data based on data classification, wherein at least part of the imaging data being assigned to a first class being defined by at least one of
    - a defined first classification criterion for the imaging data, and
    - a defined second classification criterion within a first auxiliary 3D point cloud solely based on the imaging data, in particular wherein the auxiliary 3D point cloud being generated solely by the imaging data fulfilling the first classification criterion,
- combining the imaging data of the first class with lidar data corresponding to the fraction of the area of the city scape defined by the imaging data of the first class, in the following called the critical area, in particular wherein the imaging data being replaced or supplemented by the lidar data, in particular wherein the output is made available to a hybrid 3D-imaging device according to the invention.

The invention further relates to a hybrid 3D-imaging device for aerial surveying of a city scape, the hybrid 3D-imaging device comprising one single sensor platform supporting a nadir imaging camera, particularly with multispectral bands, an oblique imaging camera, in particular a RGB or RGBN camera, in particular with an oblique angle of 30-45 degrees, and a lidar device, wherein the nadir and oblique imaging cameras being arranged on the sensor platform on a circumferential area around the lidar device.

In a particular embodiment of the hybrid 3D-imaging device the sensor platform supporting a nadir imaging camera, particularly with multispectral bands, in particular exactly one nadir camera, four oblique imaging cameras with oblique angles of 30-45 degrees with respect to the sensor platform, in particular RGB or RGBN cameras, in particular exactly four oblique cameras, and a lidar device, in particular being adapted for a Palmer lidar scan, in particular exactly one lidar device or exactly two lidar devices, wherein the four oblique imaging cameras all have different viewing directions from each other and wherein the four oblique imaging cameras and the nadir camera being placed circumferentially around the lidar device, in particular with a mostly uniform angular separation and with a common distance from the center.

This device setup provides an efficient and simultaneous acquisition of both imaging and lidar data, in a sense that the imaging and lidar data are acquired during the same surveying measurement, i.e. in one go, and wherein the imaging data can be readily processed within a stereoscopic method, e.g. by semi global matching, for creating a 3D point cloud for the generation of a 3D city model. In particular, such a hybrid 3D-imaging device might be installed in one standard aircraft hole, e.g. using a single stabilization system for stabilizing a common inertial system for the cameras and the lidar device, and being controlled by a single operator from a single controlling interface. Operation might be further supported by a dedicated mission planning software taking into account the surveyable city scape and making recommendations for operating both lidar and imaging devices to optimize data acquisition.

Depending on the acquisition area, a variety of sensor platform configurations may be possible to best support the simplified generation of the model. Thus, the hybrid sensor setup may vary depending on the application and the area to be surveyed.

DETAILED DESCRIPTION

Figure 2:
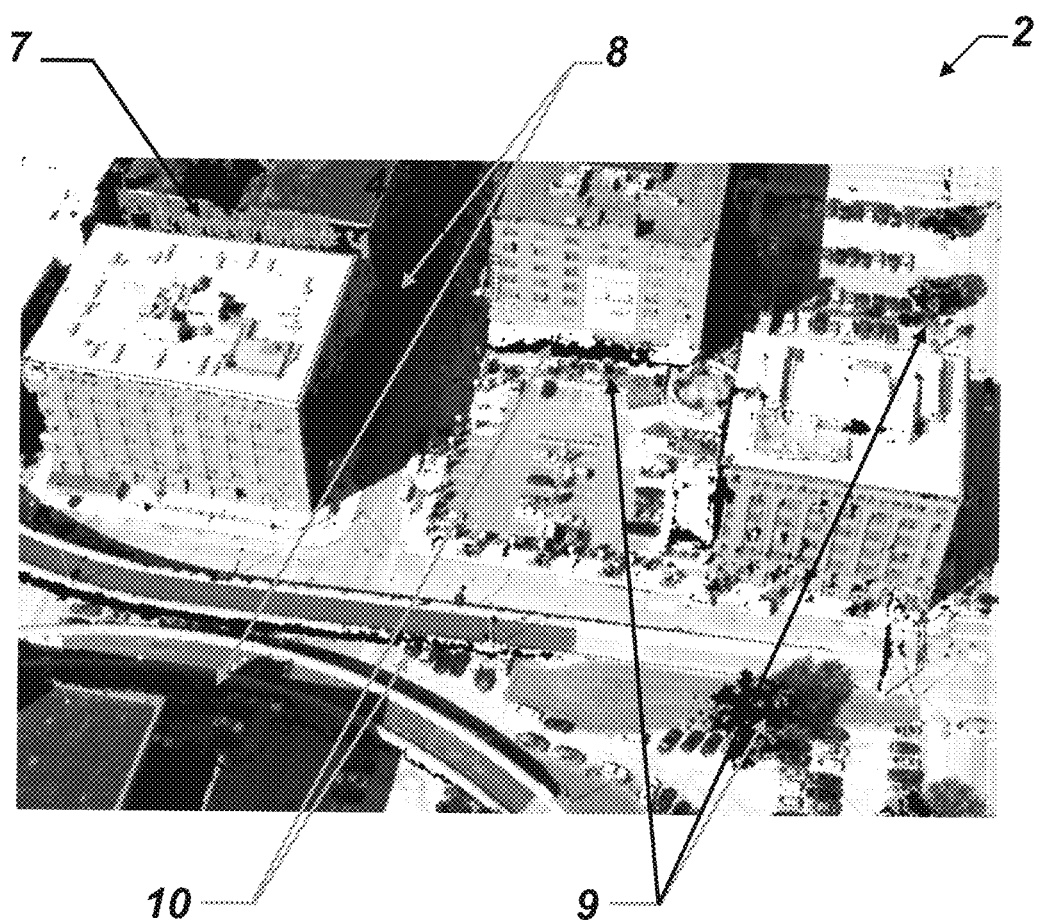
Figure 3:
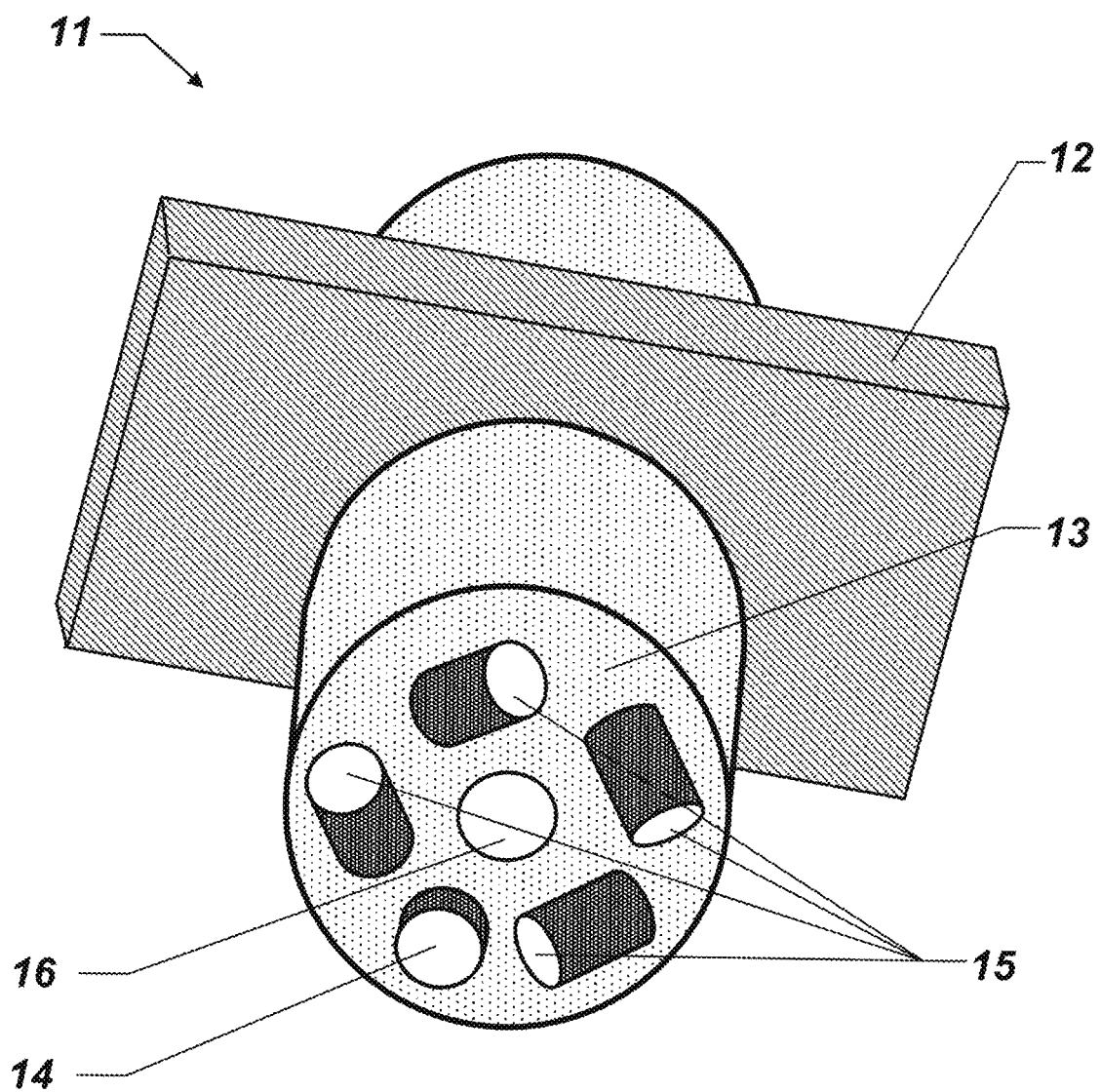

Devices, methods and setups and computer programs according to the invention are described or explained in more detail below, purely by way of example, with reference to working examples shown schematically in the drawing. Specifically, FIG. 1a,b: generic stereoscopic image processing steps for creating a 3D city model, based on stereoscopic imaging data (a) and in combination with additional building footprint data (b);

FIG. 2: generic 3D point cloud generated from stereoscopic imaging data, indicating point mismatching and other critical areas for a point matching algorithm;

FIG. 3: exemplary embodiment of a hybrid 3D-imaging device according to the invention.

The diagrams of the figures should not be considered as being drawn to scale. Where appropriate, the same reference signs are used for the same features or for features with similar functionalities.

FIG. 1 shows generic stereoscopic image processing steps for creating a 3D city model, here a 3D city model in LOD 2, based on stereoscopic imaging data and based on a combination of stereoscopic imaging data with additional model data, here building footprint data.

FIG. 1a illustrates a general process for creating a 3D city model 1 from a 3D point cloud 2 generated from stereoscopic imaging data 3 with a point matching algorithm 4, e.g. such as a single global matching (SGM) algorithm or a similar technique. Based on the 3D point cloud 2 specialized extraction models 5 are used to extract a 3D city model 1 of a given level of detail (LOD). Typically such extraction models 5 are based on object classification algorithms, particularly based on geometric and semantic classification, and usually make use of additional input such as building footprints, GIS data for creating digital terrain models (DTM), high-level CAD data for buildings and infrastructure elements, and BIM data for providing the highest level of detail for building components. 3D city models might also be generated by creating meshes from point clouds, the point clouds being generated through the extraction from stereo images using SGM or similar techniques. In certain cases objects might also be extracted from lidar data, however in the case of city modelling objects such as buildings or infrastructure are often not textured and of low resolution. Thus, for city modelling it is common practice however, that such meshes are more likely generated from Nadir and/or oblique imaging as image data offers better resolution and thus more detail.

Figure 1B:
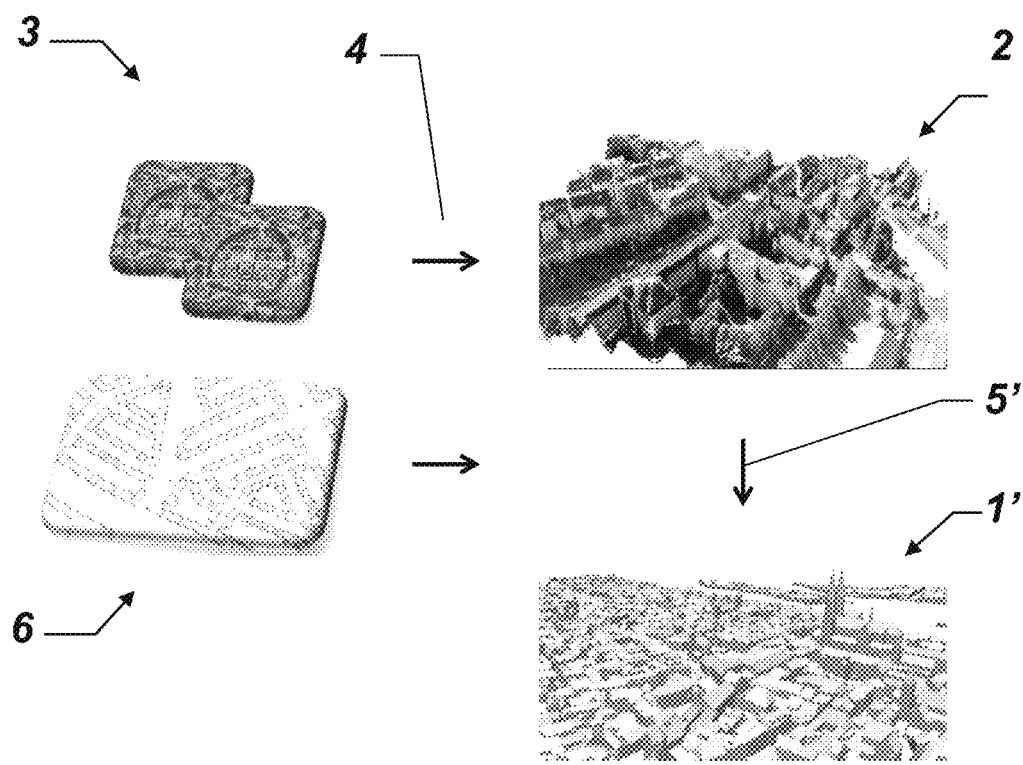

FIG. 1b illustrates a generic creation of a 3D city model 1' from a 3D point cloud 2 generated from stereoscopic imaging data 3 with a point matching algorithm 4, wherein additional building footprint data 6 is used for the extraction model 5' to generate the 3D city model. Building footprints and/or reference models such as digital surface models might particularly provide a ground reference and thus improve infrastructure modelling. In particular the building footprints and the reference model might be automatically generated based on the lidar data.

FIG. 2 shows a generic 3D point cloud 2 generated from stereoscopic imaging data 3, for example by means of a point matching algorithm 4 such as a semi global matching algorithm. Even for dense matching, i.e. for very dense image overlaps, there are areas within the point cloud 2 where point extraction efficiency is substantially worse (below average) than for the rest of the point cloud 2. This is for example the case for occlusions and canyons 7 with low lighting conditions, for shadow areas 8 exhibiting increased noise, for very inhomogeneous areas such as vegetation 9, e.g. because complex modelling is required, and for very homogeneous surfaces 10, e.g. due to a lack of defined reference structure for point matching. In the case of automatic 3D building model creation this might cause wrong building identification, wrong ground height identification, and reduced accuracy. In the case of 3D mesh generation problems such as meltdown on building edges, wrong ground height, and modelling of trees inside the mesh may occur.

Point clouds from lidar data generally do not have such issues. However, due to the lower point density, meshes have far less detail and are often not textured. Anyway, lidar data is not depending on lighting conditions and provides $1^{st}$, $2^{nd}$, and $3^{rd}$ return to see through vegetation. Therefore, according to the invention, generic (stereoscopic) imaging data is combined with lidar data, in particular for compensating and addressing particular problem areas of generic stereoscopic image processing where the accuracy and efficiency of point matching and point extraction is below average.

According to the invention lidar data is for example used to provide ground reference in low lighting areas and occlusions, and for improving point matching for vegetation areas and homogeneous surface areas such as water.

In particular, according to the invention lidar data is acquired simultaneously with the acquisition of imaging data for stereoscopic imaging. Here, simultaneous acquisition of data means an acquisition of the imaging and lidar data during the same measuring process, i.e. in one go when surveying a city scape. Therefore, by combining the best of the two worlds of stereoscopic imaging and lidar, i.e. high resolution information by stereoscopic imaging and lighting independent information by lidar, the generation of a 3D city model is strongly improved.

FIG. 3 shows a hybrid 3D-imaging device 11 according to the invention for surveying of a city scape and for acquiring data for a method according to the invention, i.e. combining an oblique imager with a lidar device in the same sensor for simultaneous acquisition of both data. Here, the hybrid 3D-imaging device 11 might be an airborne sensor device which can be installed in one standard aircraft hole, wherein the hybrid 3D-imaging device 11 comprises a single stabilizing platform 12 and its imaging and lidar subsystems can be controlled by one operator from a single control interface.

Here, the hybrid 3D-imaging device 11 comprises one single sensor platform 13 supporting exactly one nadir camera 14, particularly with multispectral bands, exactly four oblique RGB or RGBN cameras 15, in particular with oblique angles of 30-45 degrees, and exactly one lidar device 16, in particular wherein the lidar device is adapted for providing a Palmer scan. The four oblique imaging cameras 15 all have different viewing directions from each other, and the four oblique imaging cameras 15 and the nadir camera 14 are placed circumferentially around the lidar device 16, in particular with a mostly uniform angular separation and with a common distance from the center.

Depending on the acquisition area, a variety of sensor platform configurations may be possible to best support the simplified generation of the model. Thus, the hybrid sensor setup may vary depending on the application and the area to be surveyed.

The invention claimed is:

1. A hybrid 3D-imaging device for surveying of a city scape to create a 3D city model of the surveyed city scape, the hybrid 3D-imaging device comprising:
   a stereo imaging device for generating stereoscopic imaging data for an area of the city scape;
   a lidar device for generating lidar data for the area of the city scape, wherein the hybrid 3D-imaging device is configured to acquire the stereoscopic-imaging data and the lidar data during the same measuring process in one go when surveying the city scape; and
   a control and processing unit being adapted for:
      controlling the stereo imaging device and the lidar device,
      generating a 3D point cloud for the area of the city scape based on the stereoscopic imaging and the lidar data by stereoscopic image processing, and
      generating a 3D city model with automated building model extraction, based on the 3D point cloud,
   wherein:
   the control and processing unit is adapted to:
      processing of the stereoscopic imaging data within a stereoscopic method,
      assessing in real time with the generating of the stereoscopic imaging data a quality of the stereoscopic imaging data for stereoscopic imaging, wherein at least part of the stereoscopic imaging data being assigned to a first class, the first class indicating a critical area of the stereoscopic method where accuracy and efficiency of the processing of the stereoscopic imaging data within the stereoscopic method are below average, the first class being defined by at least one of:
         a defined first classification criterion for a 2D classification of the stereoscopic imaging data, and
         a generation of a first auxiliary 3D point cloud, by using the stereoscopic imaging data while disregarding the lidar data, and a defined second classification criterion within the first auxiliary 3D point cloud, and
      combining the stereoscopic imaging data of the first class with lidar data corresponding to the critical area determined based on the real time quality assessment of the stereoscopic imaging data and comprising a fraction of the area of the city scape defined by the stereoscopic imaging data of the first class.

2. The hybrid 3D-imaging device according to claim 1, wherein the control and processing unit is adapted for generating the 3D point cloud with a quality assessment of the lidar data, wherein at least part of the lidar data being assigned to a second class being defined by at least one of:
   a defined third classification criterion within a second auxiliary 3D point cloud solely based on the lidar data, and
   a defined first comparison criterion for comparing the first auxiliary 3D point cloud solely based on the stereoscopic imaging data with a third auxiliary point cloud based on a combination of the stereoscopic imaging and the lidar data,
   wherein the stereoscopic imaging data of the first class is only combined with lidar data of the critical area where the critical area is overlapping the fraction of the area of the city scape defined by the lidar data of the second class.

3. The hybrid 3D-imaging device according to claim 1, wherein the control and processing unit being adapted for generating the 3D point cloud with a quality assessment of the lidar data based on data classification, wherein at least part of the lidar data is assigned to a third class being defined by at least one of:
   a defined fourth classification criterion within the second auxiliary 3D point cloud solely based on the lidar data, and
   a defined second comparison criterion for comparing the first auxiliary 3D point cloud solely based on the stereoscopic imaging data with the third auxiliary point cloud based on a combination of the stereoscopic imaging and the lidar data,
   wherein the stereoscopic imaging data corresponds to the fraction of the area of the city scape defined by the lidar data of the third class being combined with the lidar data of the third class.

4. The hybrid 3D-imaging device according to claim 3, wherein at least one of the first to fourth classification criteria being based on a semantic classification, in particular wherein the semantic classification comprises semantic classifiers defining at least one of:
   shadowing,
   a region with an occlusion,
   a region with vegetation, and
   a region with a homogeneous surface.

5. The hybrid 3D-imaging device according to claim 1, wherein at least one of the first to second comparison criteria being based on at least one of:
   a signal to noise threshold,
   a resolution threshold, and
   a systematic error threshold.

6. The hybrid 3D-imaging device according to claim 1, wherein:
   the hybrid 3D-imaging device is built as one single hybrid 3D-imaging device, the single hybrid 3D-imaging device being adapted for acquiring lidar data for a selected region of the area within the surveyed city scape, based on at least one of:
      an a-priori model of the surveyed city scape, and
      an analysis of the stereoscopic imaging data, and
   the control and processing unit being adapted for generating the 3D point cloud with a photogrammetric method, and being adapted for processing at least one of:
      nadir and/or oblique images,
      multispectral images,
      normalized difference vegetation index images, building footprints, and
a reference model comprising at least one of a digital terrain model, a digital elevation model, and a digital surface model.

7. A hybrid 3D-imaging device for surveying of a city scape to create a 3D city model of the surveyed city scape, the hybrid 3D-imaging device comprising:
a stereo imaging device for generating stereoscopic imaging data for an area of the city scape;
a lidar device for generating lidar data for the area of the city scape, wherein the hybrid 3D-imaging device is configured to acquire the stereoscopic imaging data and the lidar data during the same measuring process in one go when surveying the city scape; and
a control and processing unit being adapted for:
controlling the stereo imaging device and the lidar device,
generating a 3D point cloud for the area of the city scape based on the stereoscopic imaging and the lidar data by stereoscopic image processing, and
generating a 3D city model with automated building model extraction, based on the 3D point cloud,
wherein:
the control and processing unit is adapted to:
processing of the stereoscopic imaging data within a stereoscopic method,
assessing in real time with the generating of the stereoscopic imaging data a quality of the stereoscopic imaging data for stereoscopic imaging, wherein at least part of the stereoscopic imaging data being assigned to a first class, the first class indicating a critical area of the stereoscopic method where accuracy and efficiency of the processing of the stereoscopic imaging data within the stereoscopic method are below average, the first class being defined by at least:
a generation of a first auxiliary 3D point cloud by the stereoscopic method, by using the stereoscopic imaging data while disregarding the lidar data, and a defined first classification criterion within the first auxiliary 3D point cloud, and
combining the stereoscopic imaging data of the first class with lidar data corresponding to the critical area determined based on the real time quality assessment of the stereoscopic imaging data and comprising a fraction of the area of the city scape defined by the stereoscopic imaging data of the first class.

8. The hybrid 3D-imaging device according to claim 7, wherein the control and processing unit is adapted for generating the 3D point cloud with a quality assessment of the lidar data, wherein at least part of the lidar data being assigned to a second class being defined by at least one of:
a defined second classification criterion within a second auxiliary 3D point cloud solely based on the lidar data, and
a defined first comparison criterion for comparing the first auxiliary 3D point cloud solely based on the stereoscopic imaging data with a third auxiliary point cloud based on a combination of the stereoscopic imaging and the lidar data,
wherein the stereoscopic imaging data of the first class is only combined with lidar data of the critical area where the critical area is overlapping the fraction of the area of the city scape defined by the lidar data of the second class.

9. The hybrid 3D-imaging device according to claim 7, wherein the control and processing unit being adapted for generating the 3D point cloud with a quality assessment of the lidar data based on data classification, wherein at least part of the lidar data is assigned to a third class being defined by at least one of:
a defined third classification criterion within the second auxiliary 3D point cloud solely based on the lidar data, and
a defined second comparison criterion for comparing the first auxiliary 3D point cloud solely based on the stereoscopic imaging data with the third auxiliary point cloud based on a combination of the stereoscopic imaging and the lidar data,
wherein the stereoscopic imaging data corresponds to the fraction of the area of the city scape defined by the lidar data of the third class being combined with the lidar data of the third class.

10. The hybrid 3D-imaging device according to claim 9, wherein at least one of the first to third classification criteria being based on a semantic classification, in particular wherein the semantic classification comprises semantic classifiers defining at least one of:
shadowing,
a region with an occlusion,
a region with vegetation, and
a region with a homogeneous surface.

11. The hybrid 3D-imaging device according to claim 7, wherein at least one of the first to second comparison criteria being based on at least one of:
a signal to noise threshold,
a resolution threshold, and
a systematic error threshold.

12. The hybrid 3D-imaging device according to claim 7, wherein:
the hybrid 3D-imaging device is built as one single hybrid 3D-imaging device, the single hybrid 3D-imaging device being adapted for acquiring lidar data for a selected region of the area within the surveyed city scape, based on at least one of:
an a-priori model of the surveyed city scape, and
an analysis of the stereoscopic imaging data, and
the control and processing unit being adapted for generating the 3D point cloud with a photogrammetric method, and being adapted for processing at least one of:
nadir and/or oblique images,
multispectral images,
normalized difference vegetation index images,
building footprints, and
a reference model comprising at least one of a digital terrain model, a digital elevation model, and a digital surface model.

13. A hybrid 3D-imaging device for surveying of a city scape to create a 3D city model of the surveyed city scape, the hybrid 3D-imaging device comprising:
a stereoscopic imaging device comprising a nadir imaging camera and an oblique imaging camera, the nadir and oblique imaging cameras being configured for generating stereoscopic imaging data, which provide readily processing within a stereoscopic method for generation of a 3D point cloud for an area of the city scape,
a scanning lidar device for generating lidar data for the area of the city scape based on a defined scan pattern,
one single sensor platform supporting the stereoscopic imaging device, which comprises the nadir imaging camera and the oblique imaging camera, and the scanning lidar device, wherein the sensor platform is configured to be installed in an aircraft hole and comprises a single controlling interface to provide control of the stereoscopic imaging device and the scanning lidar device, wherein the nadir and oblique imaging cameras and the scanning lidar device are arranged on a same face of the sensor platform, wherein the nadir and oblique imaging cameras are arranged on a circumferential area around the lidar device, and a single inertial stabilization system configured for inertial stabilization of the sensor platform and thereby providing a common inertial stabilization of the cameras and the lidar device, wherein the hybrid 3D-imaging device is configured for simultaneously generating the lidar data and the stereoscopic imaging data, wherein the stereoscopic imaging data and the lidar data are acquired during the same measuring process in one go when surveying the city scape.

14. The hybrid 3D-imaging device according to claim 13, wherein the stereoscopic imaging device comprises four oblique imaging cameras supported by the sensor platform, the four oblique imaging cameras having oblique angles of 30-45 degrees with respect to the sensor platform sensor platform, the four oblique imaging cameras all have different viewing directions from each other, and the four oblique imaging cameras and the nadir camera are placed circumferentially around the lidar device with a uniform angular separation and with a common distance from the center.

15. The hybrid 3D-imaging device according to claim 13, wherein the hybrid 3D-imaging device is configured to process the stereoscopic imaging data in real time for identifying a critical area where accuracy and efficiency of a processing of the stereoscopic imaging data within a stereoscopic method are below average.

16. The hybrid 3D-imaging device according to claim 14, wherein the hybrid 3D-imaging device is configured to process the stereoscopic imaging data in real time for identifying a critical area where accuracy and efficiency of a processing of the stereoscopic imaging data within a stereoscopic method are below average.

17. The hybrid 3D-imaging device according to claim 15, wherein the hybrid 3D-imaging device is configured to identify within the lidar data a part of the lidar data which corresponds to the critical area.

18. The hybrid 3D-imaging device according to claim 16, wherein the hybrid 3D-imaging device is configured to identify within the lidar data a part of the lidar data which corresponds to the critical area.

* * * * *